US011675695B2

(12) United States Patent
Frolikov et al.

(10) Patent No.: US 11,675,695 B2
(45) Date of Patent: Jun. 13, 2023

(54) NAMESPACE MANAGEMENT FOR MEMORY SUB-SYSTEMS

(71) Applicant: Micron Technology, Inc., Boise, ID (US)

(72) Inventors: Alexei Frolikov, San Jose, CA (US); Mark Ish, San Ramon, CA (US)

(73) Assignee: Micron Technology, Inc., Boise, ID (US)

( * ) Notice: Subject to any disclaimer, the term of this patent is extended or adjusted under 35 U.S.C. 154(b) by 38 days.

(21) Appl. No.: 16/914,939

(22) Filed: Jun. 29, 2020

(65) Prior Publication Data

US 2021/0406167 A1 Dec. 30, 2021

(51) Int. Cl.
*G06F 12/02* (2006.01)
*G06F 12/0806* (2016.01)
*G06F 12/0873* (2016.01)

(52) U.S. Cl.
CPC ...... *G06F 12/0246* (2013.01); *G06F 12/0806* (2013.01); *G06F 12/0873* (2013.01); *G06F 2212/7201* (2013.01)

(58) Field of Classification Search
CPC ............. G06F 12/0246; G06F 12/0806; G06F 12/0873; G06F 2212/7201
See application file for complete search history.

(56) References Cited

U.S. PATENT DOCUMENTS

| | | | |
|---|---|---|---|
| 10,216,630 B1 * | 2/2019 | Shang | G06F 12/0868 |
| 10,990,526 B1 * | 4/2021 | Lam | G06F 12/1009 |
| 2013/0227201 A1 * | 8/2013 | Talagala | G06F 3/0679 711/103 |
| 2018/0314441 A1 * | 11/2018 | Suryanarayana | G06F 3/065 |
| 2019/0146907 A1 * | 5/2019 | Frolikov | G06F 3/0679 711/103 |
| 2019/0146927 A1 * | 5/2019 | Frolikov | G06F 12/0246 711/103 |
| 2020/0409567 A1 * | 12/2020 | Bueb | G06F 3/0688 |
| 2021/0191638 A1 * | 6/2021 | Miladinovic | G11C 29/52 |
| 2021/0255949 A1 * | 8/2021 | Guda | G06F 12/0882 |
| 2021/0263674 A1 * | 8/2021 | Shin | G06F 3/0614 |

* cited by examiner

*Primary Examiner* — Prasith Thammavong
(74) *Attorney, Agent, or Firm* — Holland & Hart LLP (57) ABSTRACT

Methods, systems, and devices for clock domain crossing queue are described. A memory sub-system can generate a namespace map having a set of namespace blocks associated with a memory sub-system. The namespace blocks can include one or more logical block addresses associated with the memory sub-system. One namespace block of the set of namespace blocks can include an indication that can indicate that the namespace block and each namespace block following the namespace block are available for mapping. The memory sub-system can receive a request to create a namespace and sequentially map one or more available namespace blocks to the namespace according to the ordering of the namespace map, including the namespace block with the indication.

20 Claims, 6 Drawing Sheets

NAMESPACE MANAGEMENT FOR MEMORY SUB-SYSTEMS

TECHNICAL FIELD

The following relates generally to a memory sub-system and more specifically to namespace management for memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to sequential prefetching through a linking array. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

A memory device can be a non-volatile memory device. A non-volatile memory device is a package of one or more dice. Each die can consist of one or more planes. For some types of non-volatile memory devices (e.g., negative-and (NAND) devices), each plane consists of a set of physical blocks. Each block consists of a set of pages. Each page consists of a set of memory cells, which store bits of data. For some memory devices, such as NAND devices, blocks are the smallest area than can be erased and pages within the blocks cannot be erased individually. For such devices, erase operations are performed one block at a time.

A page of a block can contain valid data, invalid data, or no data. Invalid data is data that is marked as outdated as a new version of the data is stored on the memory device. Invalid data includes data that was previously written but is no longer associated with a valid logical address, such as a logical address referenced by a host system in a physical to logical (P2L) mapping table. Valid data is the most recent version of such data being stored on the memory device. A memory sub-system can mark data as invalid based on information received, for example, from an operating system. A page that does not contain data includes a page that has been previously erased, and not yet written to.

A memory sub-system can contain multiple memory cells, and each memory cell can be associated with a logical block address (LBA) within firmware of the memory sub-system. The LBAs can be stored in the firmware of the memory sub-system, and the LBAs can be used by the firmware when carrying out access operations such as when reading, writing, erasing, and re-writing data to the memory cells. In some cases, the LBAs can be organized into groups of LBAs. For example, LBAs can be contiguously ordered and organized into groups of LBA blocks. In some cases, the LBA blocks can be referred to as namespace blocks. For example, a memory sub-system can contain 8 terabytes (TB) of memory cells, and the LBAs can be grouped into 2 gigabyte (GB) namespace blocks, where each namespace block contains 2 GB of contiguously ordered LBAs. In this case, 64,000 different namespace blocks are used to organize the LBAs within the firmware (e.g., 8 TB of memory divided by 2 GB per block yields 64,000 LBA blocks).

The memory sub-system can utilize a namespace map to manage the namespace blocks within the firmware. In some cases, the namespace map can be organized into different sections. In the case of Non-Volatile Memory Express (NVMe) protocol, the sections can be referred to as namespaces. The firmware can partition the namespace map into multiple namespaces, and the namespace blocks can be allocated into each namespace. The firmware can allocate all of the namespace blocks to the namespaces until all of the namespace blocks are completely allocated, or the firmware can only allocate some of the namespace blocks to namespaces.

The firmware can utilize a free list when allocating the different namespace blocks into the namespaces. Initially, all namespace blocks can be assigned to the free list such that the free list contains all of the namespace blocks that are available for allocating to a namespace. The firmware can allocate the namespace blocks to the namespaces by reassigning the namespace blocks from the free list to a given namespace (e.g., moved from the free list to the namespace). In some cases, the firmware can continue to allocate the free namespace blocks to the namespaces until there are no longer any free namespace blocks available in the free list.

When utilizing a free list, the size of the free list is configured to be large enough to contain all of the available namespace blocks (e.g., when all of the namespace blocks are available for namespace allocation). Additionally, the namespace map can be configured to be large enough to contain all of the namespace blocks (e.g., when all of the namespace blocks have been allocated to namespaces). In these cases, there can be redundancy in the amount of firmware storage that is dedicated to managing the namespaces because both the free list and the namespace map are large enough to contain all of the namespace blocks. For example, in the case where 8 TB of memory is available and the namespace block size is 2 GB, both the free list and the namespace map each can contain enough memory to store 64,000 entries of namespace blocks. This redundancy can occupy memory that the firmware could otherwise use to improve efficiency and latency in functions of the memory sub-system.

Aspects of the present disclosure address the above and other deficiencies by providing a memory sub-system that does not include or utilize a separate free list for namespace management. Rather than utilizing and managing both a free list and a namespace map individually, the firmware can utilize a namespace map that specifies information for the namespace blocks, such as whether a given namespace block is available for mapping, without having a separate free list that contains such information. For example, an indicator within the namespace map or stored as a private variable accessible by firmware can be used to differentiate between allocated (e.g., mapped) and unallocated (e.g., unmapped) namespaces rather than by using a free list that includes unmapped LBAs available for namespace mapping and a namespace map having only LBAs mapped to namespaces. Through the use of the namespace map without the use of the free list, the redundancy of the namespace map and free list can be avoided and the firmware can function more efficiently than with the use of the free list. Such techniques can free up memory used by the memory sub-system.

Features of the disclosure are initially described in the context of a computing environment as described with reference to FIG. 1. Features of the disclosure are described in the context of a flow diagram of an example method to manage a namespace without the use of a free list and example namespace management operations without using a free list as described with reference to FIGS. 2-4. These and other features of the disclosure are further illustrated by and described with reference to a computer system that relates to namespace management for memory sub-systems as described with reference to FIG. 5.

Figure 1:
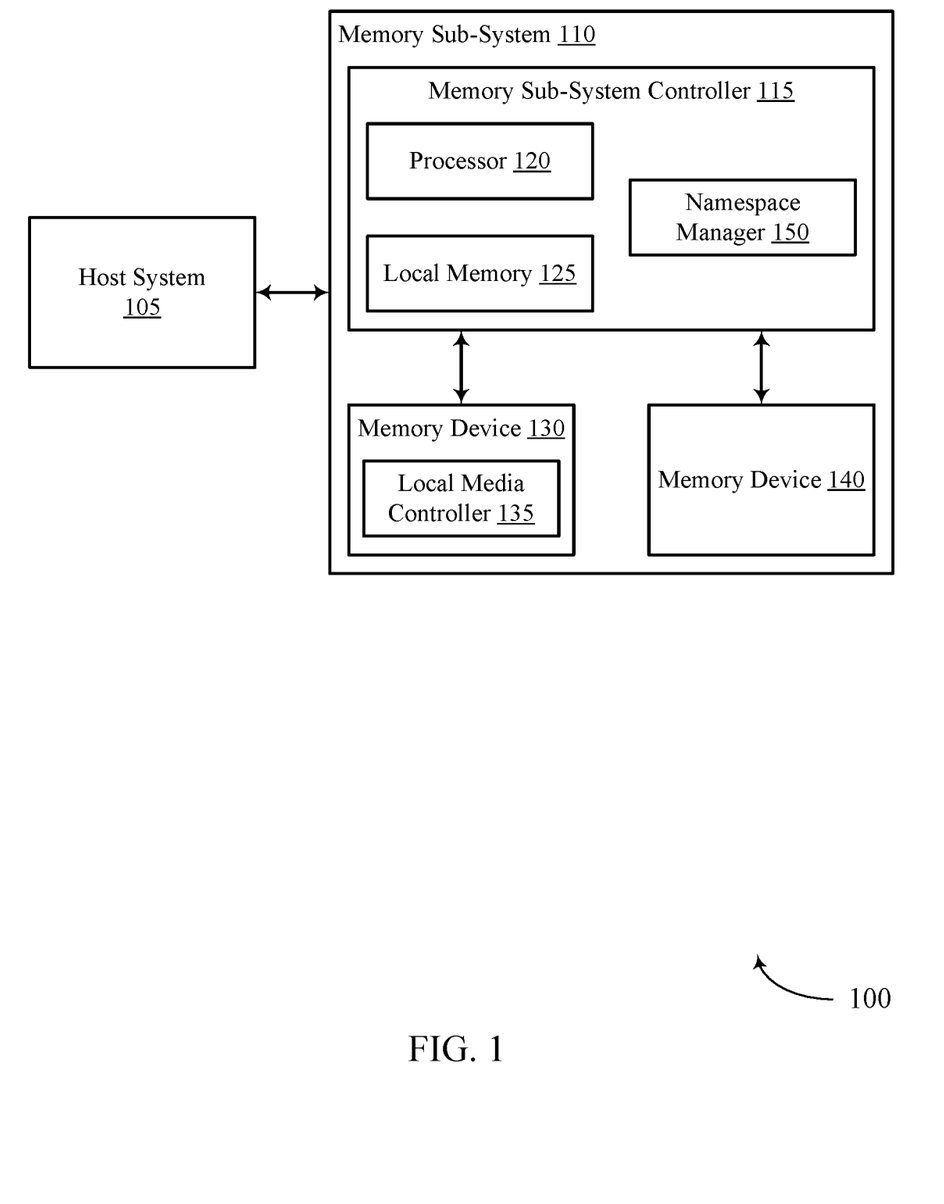
FIG. 1 is an example of a computing environment in accordance with some embodiments of the present disclosure.

FIG. 1 illustrates an example computing system 100 that includes a memory sub-system 110 in accordance with some embodiments of the present disclosure. The memory sub-system 110 can include media, such as one or more non-volatile memory devices (e.g., memory device 130), one or more volatile memory devices (e.g., memory device 140), or a combination thereof.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and a non-volatile DIMM (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with one or more memory sub-systems 110. In some examples, the host system 105 is coupled with different types of memory sub-systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, USB interface, Fiber Channel, Small Computer System Interface (SCSI), Serial Attached SCSI (SAS), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 105 and the memory sub-system 110. The host system 105 can further utilize an non-volatile memory Express (NVMe) interface to access the memory components (e.g., memory devices 130) when the memory sub-system 110 is coupled with the host system 105 by the PCIe interface. The physical host interface can provide an interface for passing control, address, data, and other signals between the memory sub-system 110 and the host system 105.

The memory devices 130, 140 can include any combination of the different types of non-volatile memory devices and/or volatile memory devices. The volatile memory devices (e.g., memory device 140) can be, but are not limited to, random access memory (RAM), such as dynamic RAM (DRAM) and synchronous DRAM (SDRAM).

Some examples of non-volatile memory devices (e.g., memory device 130) includes a NAND type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as NAND type flash memory are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric RAM (FeRAM), magneto RAM (MRAM), negative-or (NOR) flash memory, Spin Transfer Torque (STT)-MRAM, conductive bridging RAM (CBRAM), resistive random access memory (RRAM), oxide based RRAM (OxRAM), and electrically erasable programmable ROM (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), a digital signal processor (DSP)), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include read-only memory (ROM) for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 as well as convert responses associated with the memory devices 130 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a namespace manager 150 that can manage the namespaces and LBA blocks available or mapped to the namespaces (which can be referred to as namespace blocks) within the firmware of the memory sub-system 110. The namespace manager 150 can contain all of the namespace blocks associated with the memory sub-system 110, and can manage the namespace blocks through mapping of the namespace blocks to namespaces within namespace manager 150. In some cases, an indicator can be used to determine which namespace blocks are allocated to the namespaces, and the indicator can allow for the mapping of namespace blocks to namespaces without the use of a free list.

In some examples, the memory sub-system controller 115 includes at least a portion of the namespace manager 150. For example, the memory sub-system controller 115 can include a processor 120 (e.g., a processing device) configured to execute instructions stored in local memory 125 for performing the operations described herein. In some examples, the namespace manager 150 is part of the host system 105, an application, or an operating system.

The namespace manager 150 can map the namespace blocks to the namespaces without using a free list separate from the namespace manager 150. In some cases, the namespace map can contain an indicator associated with a namespace block within the namespace. The indicator can indicate the division between mapped namespace blocks and namespace blocks available for mapping (e.g., unmapped namespace blocks). In this case, when a new namespace is mapped by the firmware, the firmware can sequentially map the new namespace with the available namespace blocks, starting with the namespace block associated with the indicator (e.g., in cases where the indicator designates the first namespace block available for mapping). After mapping the new namespace, the indicator can be disassociated with the previous first available namespace block and associated a new available namespace block, which can be the first available namespace block for namespace mapping. In some cases, the indicator can be a private variable stored in memory accessible by firmware and can be or can convey the index of the first available namespace block. In the case where a namespace is deleted, the indicator can be disassociated from the previously first available namespace block, and after reordering of the navigable namespace blocks, associated with the new (i.e., updated as a result of the namespace mapping) first available namespace block. In these cases, the namespace manager 150 can be managed (e.g., namespaces can be added and deleted) without the use of a free list. Further details with regards to the operations of the namespace manager 150 are described below.

Figure 2A:
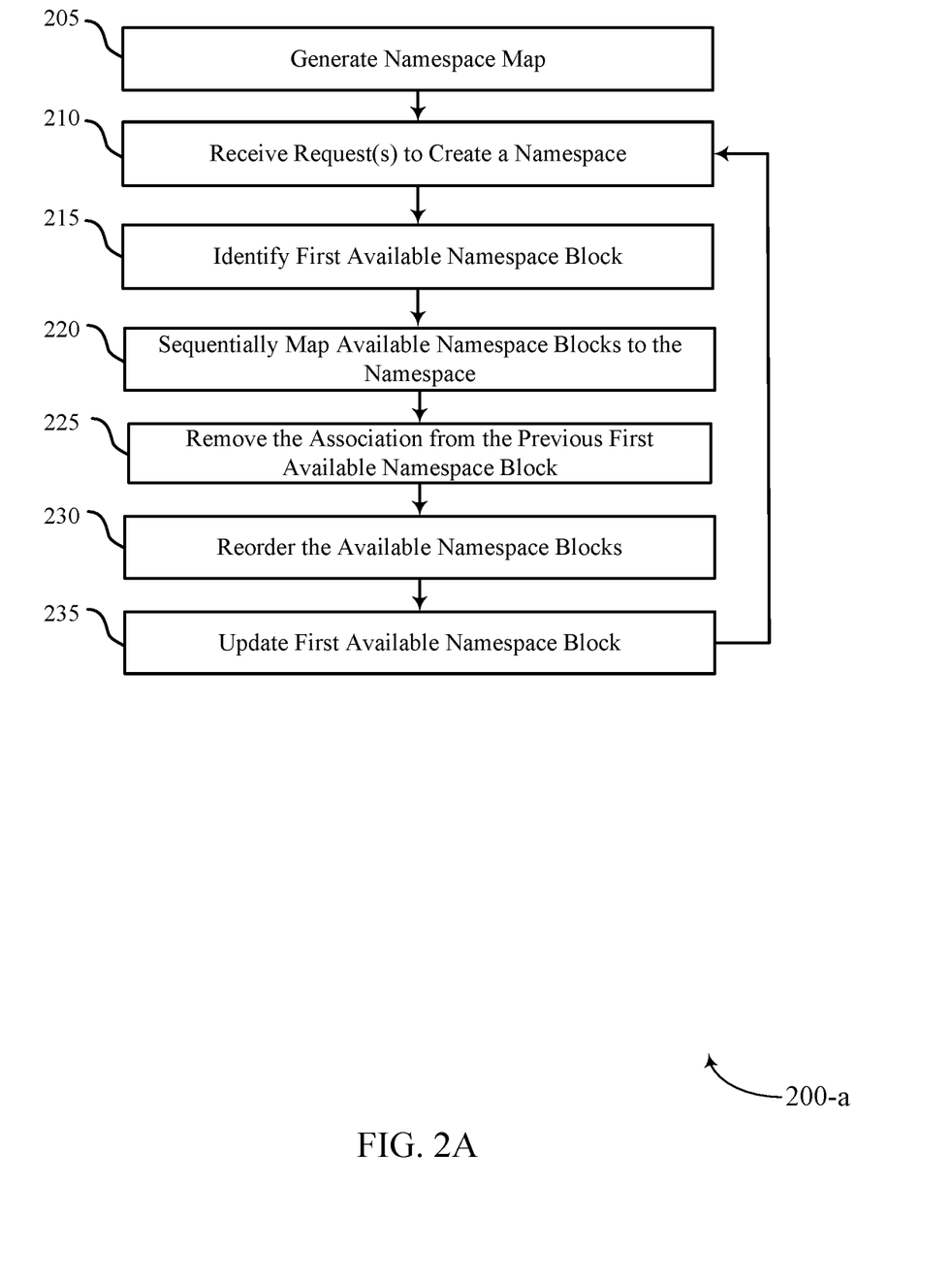
FIGS. 2A & 2B are flow diagrams of example methods to manage a namespace in accordance with some embodiments of the present disclosure.

FIG. 2A is a flow diagram of an example method 200-*a* to manage namespaces of a memory sub-system in accordance with some embodiments of the present disclosure. The method 200-*a* can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200-*a* is performed by the namespace manager 150 of FIG. 1. Although shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

At operation 205, the processing device generates a namespace map. In some embodiments, the namespace map is generated one time for the lifetime of the memory sub-system. For example, one or more default namespace maps can be generated at the time of manufacturing of the memory sub-system or at time of first boot-up. In other cases, the namespace map is generated more than once over the lifetime of the memory sub-system. For example, if the memory sub-system undergoes formatting during its lifetime (e.g., a low level format to reset the drive to a manufacturing state). The namespace map can contain enough entries to organize each namespace block within the namespace map. As discussed above, each namespace block can contain groups of contiguously ordered LBAs (e.g., sequentially ordered LBAs) associated with the memory cells within the memory sub-system. In this case, the size of the namespace map can be based upon the number of namespace blocks in the memory sub-system and therefore on the number of LBAs, which can be grouped into each namespace block. For example, the firmware can organize the LBAs into 2 GB namespace blocks. In this case, the namespace map can contain enough entries for each 2 GB namespace block, and the namespace map size can be based upon this amount of entries. In some cases, the firmware can change the namespace block size, and the size of the namespace map can accommodate the change. For example, the firmware can decrease the size of the namespace block to 1 GB. In this case, the namespace map can double in the amount of entries to accommodate twice as many namespace blocks.

At operation 210, the processing device receives a request to create a namespace. The request can be a host request for namespace management received from a host system, such as host system 105 as discussed with reference to FIG. 1. In some cases, the request can be received upon bootup of the memory sub-system or when a new namespace is requested from a host system 105. In some embodiments, the request is an opcode, such as a namespace management opcode. Within the opcode, a select instruction specifies a namespace create, which the processing device identifies and uses to generate the namespace. In some cases, the request can include the size of the namespace. The size of the namespace can determine the number of namespace blocks assigned to the namespace. For example, the memory sub-system can receive a request to create a 24 GB namespace. In the case where the namespace block size is set at 2 GB, 12 namespace blocks can be allocated to the namespace (e.g., 12 namespace blocks at 2 GB each yields a 24 GB namespace).

In some cases, the namespace map can be organized according to an index. For example, an index number can be associated with each entry in the namespace map to which a namespace block is allocated. In this case, each namespace can therefore be associated with a group of contiguous index numbers. Namespace blocks can then be allocated to the namespace, and the namespace is associated with the index numbers. In this case, the index numbers can be used to manage the allocation of the namespace blocks to the namespace. In other cases, a namespace map may not be ordered according to index and instead may be a random order.

At operation 215, the processing device identifies the first available namespace block. For example, an indicator, such as a set of bits of a variable, can be associated with a namespace block of the namespace map that is available for namespace allocation. In some cases, the namespace block can be the first available namespace block for namespace allocation (e.g., the first namespace block that is not allocated to a namespace (e.g., according to an increasing order of namespace indices)). In some embodiments, the variable can be a private variable associated with the namespace map and accessible by the firmware of the memory sub-system (e.g., the variable can be stored on memory of the memory sub-system that is accessible by the firmware). The firmware can then reference this variable when determining available namespace blocks to map to the namespace. The indicator can be used to specify a division in the namespace map between available and unavailable namespace blocks. For example, all of the namespace blocks ordered before (e.g., with index numbers less than) the indicator can be the unavailable namespace blocks, and all of the namespace blocks ordered after (e.g., with index numbers greater than) the indicator can be the available namespace blocks.

At operation 220, the processing device maps available namespace blocks. For example, available namespace blocks can be sequentially mapped (e.g., allocated) to the namespace. As discussed above, the first available namespace block can be allocated to the namespace. Additional namespace blocks can be allocated to the namespace until the size of the namespace is fully allocated. For example, a 24 GB namespace can be requested, and based upon a namespace block size of 2 GB, 12 namespace blocks can be allocated to the namespace to fill the namespace. In this case, the first available namespace block is mapped to the namespace, as well as 11 additional namespace blocks. The additional namespace blocks mapped to the namespace can sequentially follow the first available namespace block according to the index of the namespace block. For example, in the case where the index number of the first available namespace is 32, namespace block 33 through 43 are also mapped to the namespace.

At operation 225, processing device removes the association of the variable or indicator with the first available namespace block of operation 215 (i.e., the processing device disassociates the indicator from the previous first available namespace block). The indication is disassociated with the namespace block since the namespace block is no longer the first available namespace block, nor a namespace block available for namespace allocation. In this case, the index number associated with the block is also no longer associated with the first available namespace block for namespace allocation.

At operation 230, the process device reorders the available namespace blocks. As discussed in operation 220, previously available namespace blocks have been allocated to the namespace. In this case, the index numbers associated with the available and unavailable namespace blocks can no longer correspond to namespace blocks that are available for namespace allocation. In this case, the firmware can reorder the available namespace blocks by assigning the newly available namespace blocks to index numbers corresponding to the available namespace blocks. In some cases, this can reorder all of the available namespace blocks to new index numbers in the namespace map. For example, in the case where the new namespace has been mapped to occupy index numbers 32-43, all of the available namespace blocks (e.g., namespace blocks associated with index numbers greater than 43) can be reordered.

At operation 235, the processing devices updates the first available namespace block that is available for namespace mapping. As discussed previously, at operation 225, the association of the variable indicating the first available namespace block can be removed from the previously first available namespace, and at operation 230, the available namespace blocks can be reordered. In this case, the variable or indicator can be written to storage or memory of the memory sub-system that is accessible by firmware and can be associated with or updated with a set of bits that corresponds to an index of a new (e.g., second) namespace block that is available for namespace allocation. The new namespace block can be the now-first available namespace block for namespace allocation (e.g., the first namespace block that is not allocated to a namespace after the namespace has been allocated). The firmware can then allocate this first available namespace block and additional available namespace blocks to another namespace.

In some cases, operations 210-235 can be performed reiteratively to map multiple namespaces in a case where multiple requests for creating namespaces is received at the memory sub-system. For example, a request to create an additional namespace can be received by the memory sub-system (e.g., similar to operation 210). The memory sub-system can then sequentially allocate multiple available namespace blocks to the namespace (e.g., similar to operation 220) based on the variable that indicates the first available namespace block for mapping, remove the association from the now-mapped namespace block (e.g., similar to operation 225), reorder the available namespace blocks (e.g., similar to operation 230), and associate another namespace block that is available for namespace mapping (e.g., similar to operation 235) with the indicator or variable. These steps can be repeated in order to map multiple namespaces in the namespace map.

Figure 2B:
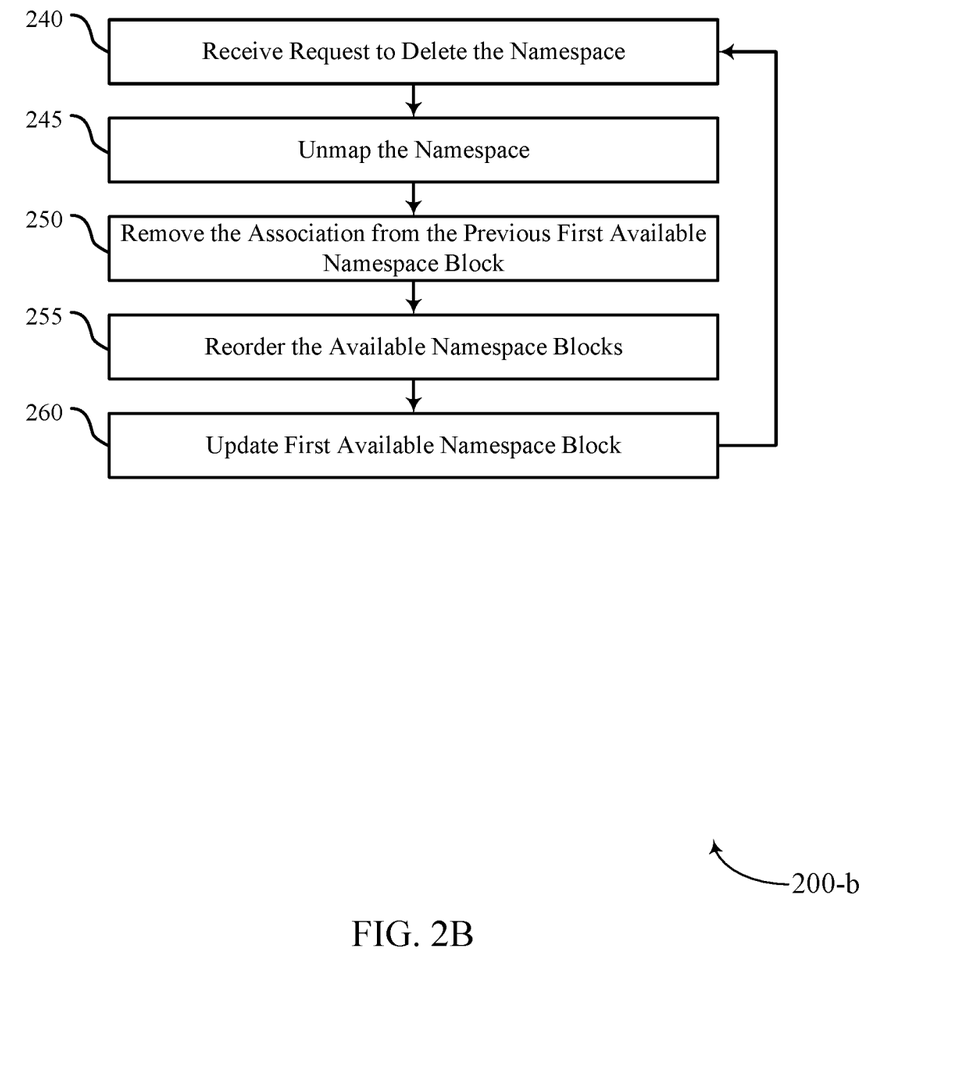

FIG. 2B is a flow diagram of an example method 200-*b* to manage namespaces of a memory sub-system in accordance with some embodiments of the present disclosure. The method 200-*b* can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200-*b* is performed by the namespace manager 150 of FIG. 1. Although shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

In some cases, a previously mapped namespace can be deleted from a namespace map. Deletion of a namespace can occur after one or more namespaces have been allocated in the namespace map. For example, at operation 240, the memory sub-system can receive a request to delete a namespace that has been mapped to the namespace map. The mapping of the namespace can have occurred during operations 210-235 (e.g., mapping a first namespace) or operations similar to operations 210-235 (e.g., mapping a subsequent namespace) as described in FIG. 2A.

The request can be a host request for namespace management received from a host system, such as host system 105 as discussed with reference to FIG. 1. In some embodiments, the request is an opcode, such as a namespace management opcode. Within the opcode, a select instruction specifies a namespace delete, which the processing device identifies and uses to delete the namespace. In some cases, the request can include the size of the namespace. The size of the namespace can indicate the number of namespace blocks assigned to the namespace. For example, the memory sub-system can receive a request to delete a 24 GB namespace. In the case where the namespace block size is set at 2 GB, 12 namespace blocks are allocated to the namespace (e.g., 12 namespace blocks at 2 GB each yields a 24 GB namespace).

At operation 245, the processing device unmaps the previously allocated namespace. Unmapping of the namespace can include disassociating each mapped namespace block from the namespace and associating the now disassociated namespace blocks with namespace blocks available for mapping. In this example, the unmapped namespace blocks can be associated with index numbers that are available for mapping. For example, in the case where a namespace includes namespace blocks associated with index numbers 32 through 43 (e.g., namespace blocks 32 through 43 are mapped to a namespace), and the namespace is deleted, the index numbers previously associated with the namespace (e.g., index numbers 32 through 43) can then be associated with free namespace blocks available for namespace mapping.

At operation 250, the processing device disassociates the indication (e.g., the variable) that was previously associated with the first available namespace block. In some cases, the indication is removed from association with this namespace block because the namespace block is no longer the first available namespace block for namespace mapping. For example, in the case that the namespace is deleted that was associated with index numbers 32 through 43, the index number associated with the first available namespace block can change from 44 (e.g., the first available namespace block before namespace deletion) to an index number of 32 (e.g., the new first available namespace block index number after namespace deletion). In this case, the indication previously indicated the namespace block associated with index 44 as can be removed since the namespace block associated with index number 32 is now the first available namespace block for namespace mapping. In some cases, however, after unmapping the namespace, the first available namespace block for mapping is the same as before mapping the namespace and removing the association of the indicator with the first available namespace block is not performed.

At operation 255, the processing device reorders the available namespace blocks in the namespace map. Similar to operation 235, previously mapped namespace blocks can have been unmapped from the namespace. In this case, the index numbers associated with the available and unavailable namespace blocks can no longer correspond to namespace blocks that are available for namespace allocation. In this case, the firmware can reorder the available namespace blocks by assigning the unmapped namespace blocks to index numbers corresponding to available namespace blocks. In some cases, this can reorder all of the available namespace blocks to new index numbers in the namespace map. For example, after the deletion of the namespace previously associated with index numbers 32 through 43, all of the now available namespace blocks (e.g., namespace blocks associated with index numbers greater than 31) can be reordered.

At operation 260, the processing device updates the first available namespace block. As discussed previously, at operation 250, the indication can be disassociated from the previously first-available namespace block, and at operation 255, the namespace map can be reordered. After deleting the namespace and reordering of the available namespace blocks, the indication can be associated with a different namespace block. This namespace block can be the new first-available namespace block in the namespace map. For example, as discussed previously, the namespace associated with index numbers 32 through 43 can be deleted, and the available namespace blocks can be reordered, such that the namespace associated with index number 32 is now the first available namespace block. In this case, the indication is updated to be associated with the namespace block associated with index number 32.

In some cases, operations similar to operations 240-260 can be performed reiteratively to delete (e.g., unmap) multiple namespaces. For example, a request to delete a second namespace can be received by the memory sub-system (e.g., similar to operation 240). The memory sub-system can then unmap the namespace blocks from the namespace (e.g., similar to operation 245), remove the association of the indicator with the previously first available namespace block (e.g., similar to operation 250), reorder the available namespace blocks (e.g., similar to operation 255), and update the indication of the first available namespace block to a new namespace block that is available for namespace mapping (e.g., similar to operation 260). These steps can be repeated in order to unmap multiple namespaces in the namespace map.

Figure 3:
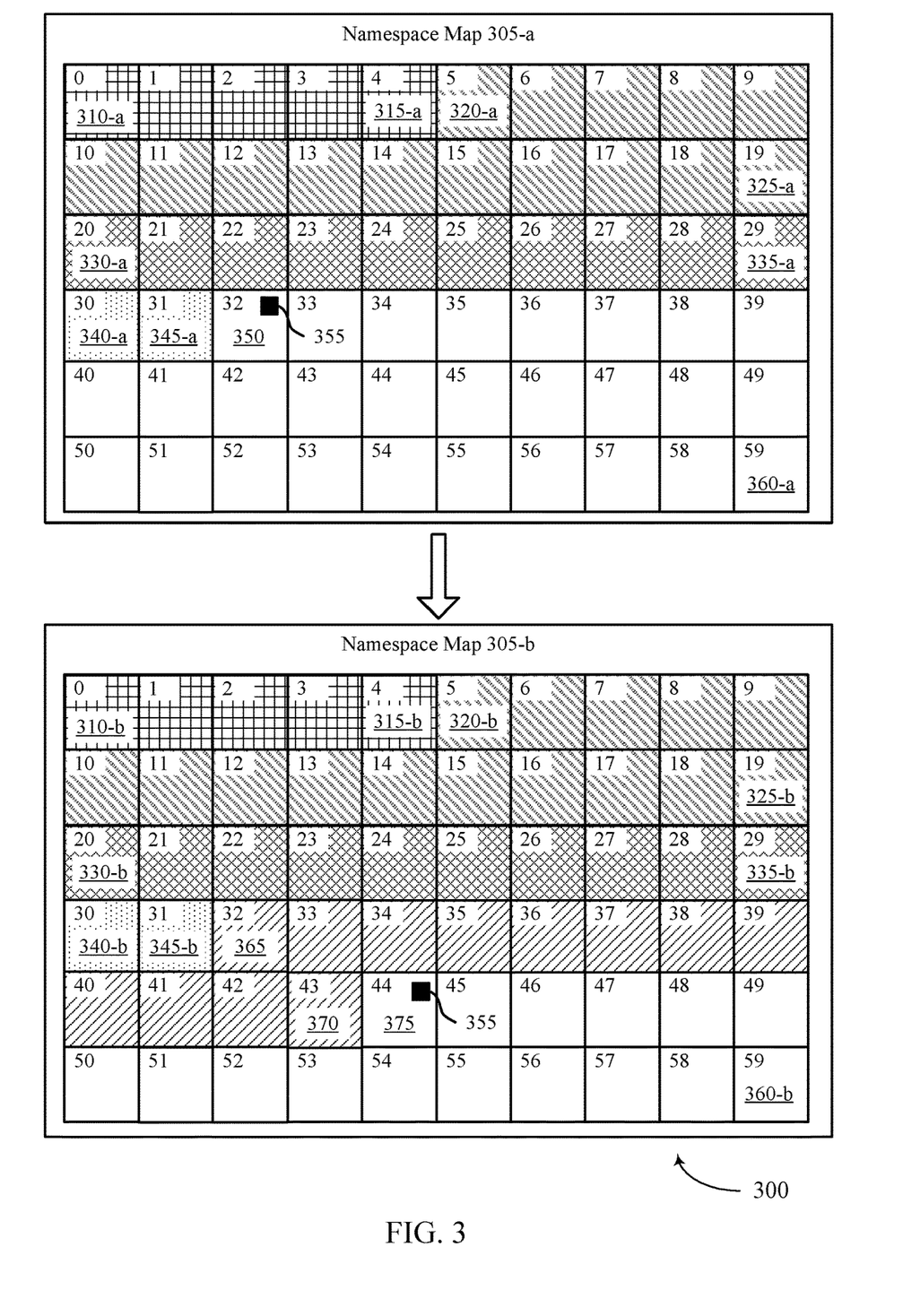
FIG. 3 illustrates an example namespace management operation in accordance with some embodiments of the present disclosure.

FIG. 3 illustrates an example namespace management operation 300 where a namespace has been deleted without the use of a free list. In some cases, the namespace management operation 300 can include some of the processing steps of method 200-*a*, as performed by namespace manager 150 as illustrated in FIG. 1.

The namespace management operation 300 can include the addition of a namespace to a namespace map. Namespace map 305-*a* and namespace map 305-*b* illustrate two examples of namespace maps showing the change in the namespace map before namespace creation, as indicated by namespace map 305-*a*, and after namespace creation, as indicated by namespace map 305-*b*.

Namespace map 305-*a* illustrates an example namespace map before the mapping of a new namespace. Namespace map 305-*a* can include four mapped namespaces. The first namespace can include five namespace blocks beginning at namespace block 310-*a* (e.g., index number 0) and including all sequentially ordered namespace blocks until, and including, namespace block 315-*a* (e.g., index number 4). The second namespace can include fifteen namespace blocks beginning at namespace block 320-*a* (e.g., index number 5) and including all sequentially ordered namespace blocks until, and including, namespace block 325-*a* (e.g., index number 19). The third namespace can include 10 namespace blocks beginning at namespace block 330-*a* (e.g., associated with index number 20) and including all sequentially ordered namespace blocks until, and including, namespace block 335-*a* (e.g., associated with index number 29). The fourth namespace can include two namespace blocks beginning at namespace block 340-*a* (e.g., associated with index number 30) and include all sequentially ordered namespace blocks until, and including, namespace block 345-*a* (e.g., associated with index number 31). In this case, namespace block 350 can be the first available unmapped namespace block (e.g., associated with index number 32), and all namespace block sequentially ordered after namespace block 350, until, and including namespace block 360-*a* (e.g., associated with index number 59) can be namespace blocks available for namespace mapping.

In the case of namespace map 305-*a*, an indication 355 can be a variable (e.g., a private variable written to storage accessible by firmware) and can be associated with namespace block 350 (e.g., as described with reference to operation 215 of method 200-*a*). In some cases, the indication 355 is a set of bits representative of the index of the namespace block with which the indication 355 is associated. The indication 355 indicates that namespace block 350 is the first available namespace block for namespace mapping. The indication 355 can indicate that all namespace blocks associated with index numbers greater than namespace block 350 are available for namespace mapping (e.g., associated with index numbers greater than or equal to 32). Although namespace blocks with index numbers between 32 and 59 are shown in namespace map 305-*a* in increasing consecutive order, such an order is non-limiting and any ordering (e.g., a random order) of the namespace blocks may be considered without departing from the scope of the disclosure.

As discussed regarding operation 205 of method 200-*a*, the memory sub-system can receive a request to create a new namespace. The request can include the size of the namespace, and the memory sub-system can determine the number of namespace blocks to allocate to the namespace. For example, a request can be received for a 24 GB namespace. In the case where each namespace block includes 2 GB of contiguously ordered LBAs, twelve namespace blocks would be allocated to the requested namespace. In this case twelve available namespace blocks would be mapped to the requested namespace. As discussed with reference to operation 220 of method 200-*a*, the twelve namespace blocks can be mapped to the new namespace according to the ordering of namespace map 305-*a*.

Namespace map 305-*b* illustrates an example namespace map after the mapping of a new namespace. As with namespace map 305-*a*, the first four namespaces can have already been mapped and include namespaces associated with index numbers 0 through 31. The newly mapped fifth namespace can include twelve namespace blocks beginning at namespace block 365 (e.g., associated with index number 32) and include all sequentially ordered namespace blocks until, and including, namespace block 370 (e.g., associated with index number 29). As discussed with reference to operation 225 of method 200-*a*, after the mapping of the new namespace to namespace map 305-*b*, the indication 355 can be disassociated from the previously first-available namespace block. As illustrated in namespace map 305-*a*, the indication 355 can have previously been associated with namespace block 350 indicating that namespace block 350 was the first available namespace block. Upon mapping of the new namespace (the fifth namespace), namespace block 350 is now associated with the new namespace and is no longer available for namespace mapping.

In response to the allocation of the available namespace blocks to the new namespace (e.g., namespace blocks associated with index numbers 32 through 43), and as discussed with reference to operation 230 of method 200-*a*, the available namespace blocks can be reordered. As discussed with reference to operation 235 of method 200-*a*, after reordering of the available namespace blocks, the indication 355 can be updated to be associated with a new first available namespace block. For example, after reordering of the available namespace blocks (e.g., as associated with index numbers 44 through 59), the new first available namespace block can be namespace block 375 (e.g., associated with index number 44). In this case, indication 355 can be associated with namespace block 375. The indication 355 can indicate that namespace block 375 is now the first available namespace block for namespace mapping, and in the event that a second new namespace is mapped to the memory sub-system, namespace block 375 can be used to indicate namespace blocks available for mapping.

Figure 4:
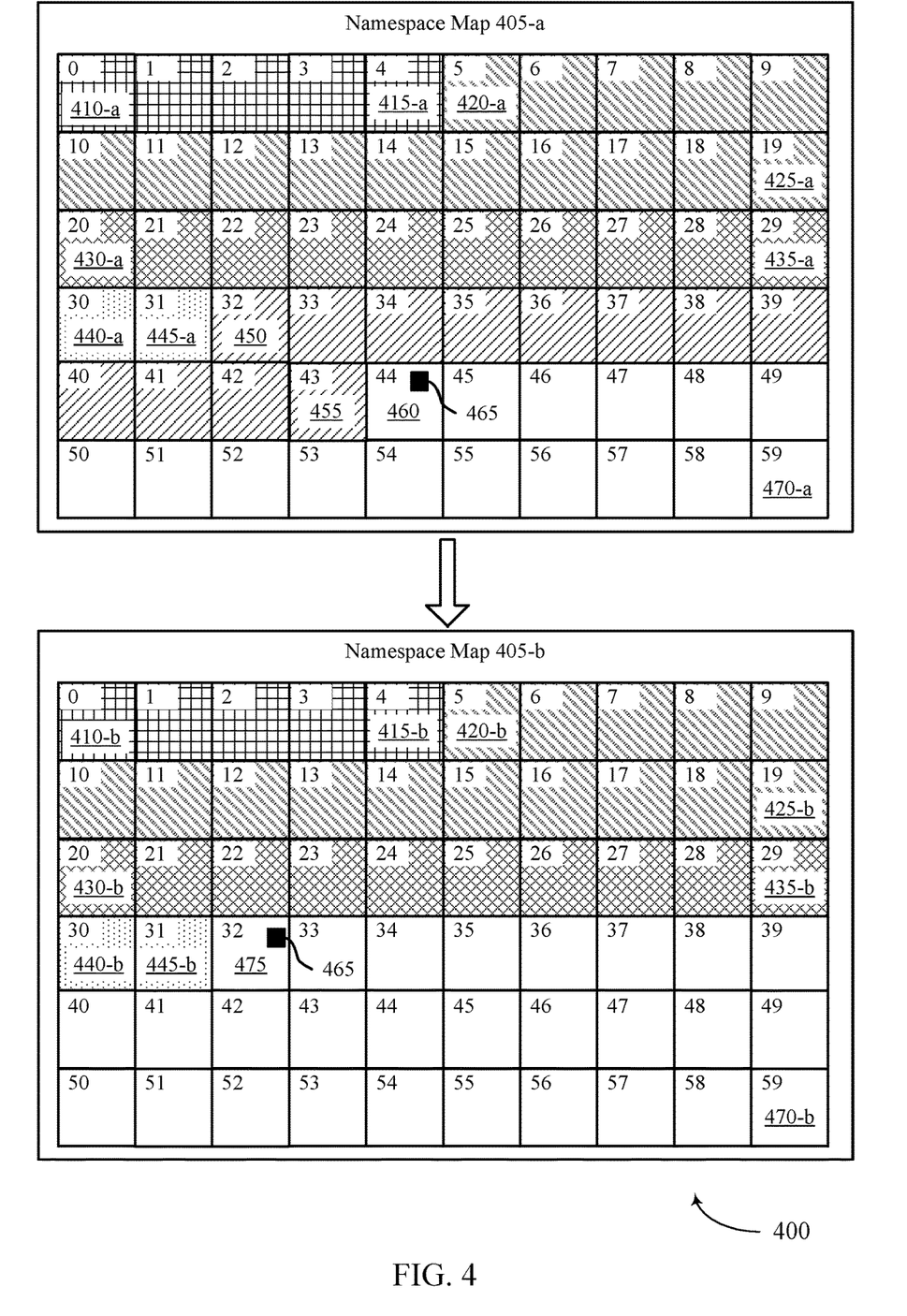
FIG. 4 illustrates an example namespace management operation in accordance with some embodiments of the present disclosure.

FIG. 4 illustrates an example namespace management operation 400 where a namespace has been deleted without the use of a free list. In some cases, the namespace management operation 400 can include some of the processing steps of method 200-*b*, as performed by namespace manager 150 as illustrated in FIG. 1.

The namespace management operation 400 can include the deletion of a namespace from a namespace map. Namespace map 405-*a* and namespace map 405-*b* illustrate two examples of a namespace map showing the change in the namespace map before namespace deletion, as indicated by names map 405-*a*, and after namespace deletion, as indicated by namespace map 405-*b*.

Namespace map 405-*a* illustrates an example namespace map before the deletion of a namespace from the namespace map. Namespace map 405-*a* can include five previously mapped namespaces. The first namespace can include five namespace blocks beginning at namespace block 410-*a* (e.g., index number 0) and including all sequentially ordered namespace blocks until, and including, namespace block 415-*a* (e.g., index number 4). The second namespace can include fifteen namespace blocks beginning at namespace block 420-*a* (e.g., index number 5) and including all sequentially ordered namespace blocks until, and including, namespace block 425-*a* (e.g., index number 19). The third namespace can include 10 namespace blocks beginning at namespace block 430-*a* (e.g., associated with index number 20) and including all sequentially ordered namespace blocks until, and including, namespace block 435-*a* (e.g., associated with index number 29). The fourth namespace can include two namespace blocks beginning at namespace block 440-*a* (e.g., associated with index number 30) and include all sequentially ordered namespace blocks until, and including, namespace block 445-*a* (e.g., associated with index number 31). The fifth namespace can include twelve namespace blocks beginning at namespace block 450 (e.g., associated with index number 32) and including all sequentially ordered namespace blocks until, and including, namespace block 455 (e.g., associated with index number 43). In this case, namespace block 460 can be the first available unmapped namespace block (e.g., associated with index number 44), and all namespace block sequentially ordered after namespace block 460, until, and including namespace block 470-*a* (e.g., associated with index number 59) can be namespace blocks available for namespace mapping. Although namespace blocks with index numbers between 44 and 59 are shown in namespace map 405-*a* in increasing consecutive order, such an order is non-limiting and any ordering (e.g., a random order) of the namespace blocks may be considered without departing from the scope of the disclosure.

In the case of namespace map 405-*a*, an indication 465 can be a variable (e.g., a private variable written to storage accessible by firmware) and can be associated with namespace block 460 (e.g., as described with reference to operation 235 of method 200-*a*). In some cases, the indication 465 is a set of bits representative of the index of the namespace block with which the indication 465 is associated. The indication 465 indicates that namespace block 460 is the first available namespace block for namespace mapping. The indication 465 can indicate that all namespace blocks associated with index numbers greater than namespace block 460 are available for namespace mapping (e.g., associated with index numbers greater than 44).

As discussed regarding operation 240 of method 200-*b*, the memory sub-system can receive a request to delete (e.g., unmap) a namespace. For example, the memory sub-system can receive a request to delete the fifth namespace (e.g., the fifth namespace including the twelve namespace blocks beginning at namespace block 450, as associated with index number 32, and including all sequentially ordered namespace blocks until, and including, namespace block 455, associated with index number 43).

As discussed regarding operation 245 of method 200-*b*, the namespace can be unmapped. In this case, the namespace blocks previously associated with the now deleted namespace can be unmapped in the namespace map. For example, in response to the deletion of the fifth namespace, namespace blocks associated with index numbers 32 through 43 can be unmapped from the fifth namespace (e.g., disassociated from the fifth namespace), and be associated with unmapped (e.g., available) namespace blocks.

As discussed with reference to operation 250 of method 200-*b*, after the unmapping of the namespace blocks from the deleted namespace, the indication 465 can be disassociated from the previously first-available namespace block. As illustrated in namespace map 405-*a*, the indication 465 can have previously been written to namespace block 460 indicating that namespace block 460 was the first available namespace block. Upon deletion of the fifth namespace, the indication 465 can be disassociated with namespace block 460 as namespace block 460 is no longer be the first namespace block available for namespace mapping. In response to the unmapping of the fifth namespace (e.g., namespace blocks associated with index numbers 32 through 43 now being available for namespace mapping), and as discussed with reference to operation 255 of method 200-*b*, the available namespace blocks can be reordered. As discussed with reference to operation 260 of method 200-*b*, after reordering of the available namespace blocks, the indication 465 can be updated to be associated with a new first available namespace block. For example, after reordering of the available namespace blocks (e.g., as associated with index numbers 32 through 59), the new first available namespace block is namespace block 475 (e.g., associated with index number 32). In this case, an indication 465 can be associated with namespace block 475. The indication 465 can indicate that namespace block 475 is now the first available namespace block for namespace mapping.

Figure 5:
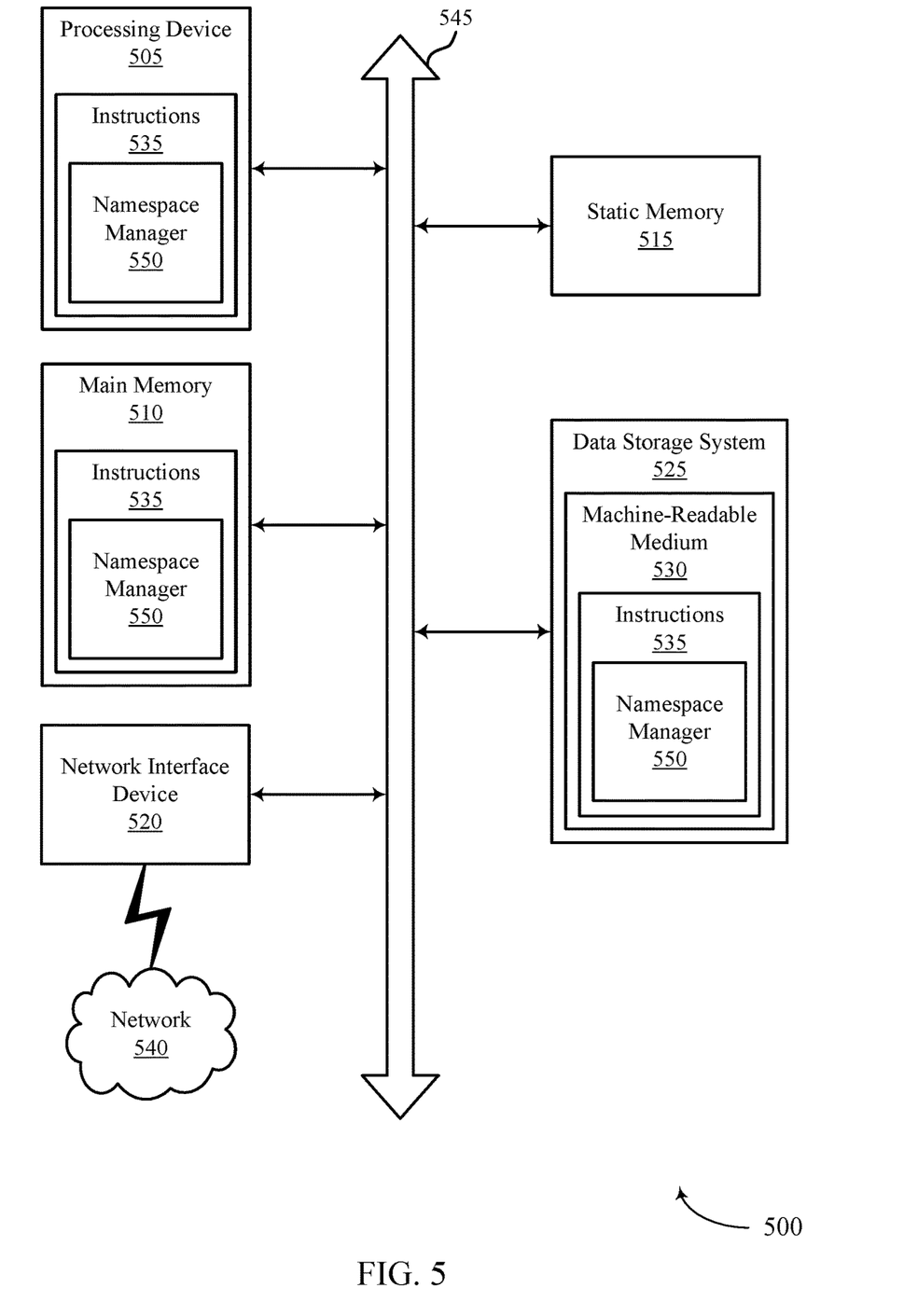
FIG. 5 is an example machine of a computer system in which embodiments of the present disclosure can operate.

FIG. 5 is an example machine of a computer system 500 in which examples of the present disclosure can operate. The computer system 500 can include a set of instructions, for causing the machine to perform any one or more of the techniques described herein. In some examples, the computer system 500 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the namespace manager 150 described with reference to FIG. 1). In some examples, the machine can be connected (e.g., networked) with other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 500 can include a processing device 505, a main memory 510 (e.g., read-only memory (ROM), flash memory, DRAM such as SDRAM or RDRAM, etc.), a static memory 515 (e.g., flash memory, static random access memory (SRAM), etc.), and a data storage system 525, which communicate with each other via a bus 545.

Processing device 505 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 505 can also be one or more special-purpose processing devices such as an application specific integrated circuit (ASIC), a field programmable gate array (FPGA), a digital signal processor (DSP), network processor, or the like. The processing device 505 is configured to execute instructions 535 for performing the operations and steps discussed herein. The computer system 500 can further include a network interface device 520 to communicate over the network 540.

The data storage system 525 can include a machine-readable storage medium 530 (also known as a computer-readable medium) on which is stored one or more sets of instructions 535 or software embodying any one or more of the methodologies or functions described herein. The instructions 535 can also reside, completely or at least partially, within the main memory 510 and/or within the processing device 505 during execution thereof by the computer system 500, the main memory 510 and the processing device 505 also constituting machine-readable storage media. The machine-readable storage medium 530, data storage system 525, and/or main memory 510 can correspond to a memory sub-system.

In one example, the instructions 535 include instructions to implement functionality corresponding to a namespace manager 550 (e.g., the namespace manager 150 described with reference to FIG. 1). While the machine-readable storage medium 530 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as a ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader scope of examples of the disclosure as set forth in the following claims. The specification and drawings are, accordingly, to be regarded in an illustrative sense rather than a restrictive sense.

What is claimed is:

1. A method comprising:
generating a namespace map having a set of namespace blocks associated with a memory sub-system, wherein an unmapped namespace block of the set of namespace blocks indicates that the unmapped namespace block and each namespace block following the unmapped namespace block, according to an ordering of the namespace map, are available for mapping, and wherein each namespace block comprises one or more logical block addresses associated with the memory sub-system, wherein the indication corresponds to a division of the namespace map where each namespace block ordered before the unmapped namespace block associated with the indication is unavailable for mapping and each namespace block ordered after the unmapped namespace block associated with the indication is available for mapping;
receiving, after generating the namespace map, a request to create a namespace using the namespace map; and
sequentially mapping, in response to the request, one or more available namespace blocks to the namespace according to the ordering of the namespace map, wherein the one or more available namespace blocks comprise at least the unmapped namespace block.

2. The method of claim 1, wherein a size of the unmapped namespace block is based at least in part on a number of logical block addresses associated with the unmapped namespace block.

3. The method of claim 1, wherein the one or more logical block addresses associated with the unmapped namespace block are sequentially ordered within the unmapped namespace block.

4. The method of claim 1, wherein a size of the namespace map is based at least in part on a number of namespace blocks associated with the namespace map and a size of the memory sub-system.

5. The method of claim 1, further comprising:
receiving a second request to delete the namespace; and
unmapping, within the namespace map, each namespace block associated with the namespace in response to the second request.

6. The method of claim 5, wherein unmapping each namespace block associated with the namespace comprises:
disassociating each namespace block from the namespace within the namespace map; and
associating each disassociated namespace block within the namespace map as namespace blocks that are available for namespace mapping according to the ordering of the namespace map.

7. The method of claim 6, further comprising:
updating a variable with an index of the unmapped namespace block before mapping the unmapped namespace block, wherein the variable indicates a first-available namespace block for mapping;
disassociating the unmapped namespace block with the variable in response to the second request; and
updating the variable with a second index of a second unmapped namespace block based at least in part on the unmapping of each namespace block.

8. The method of claim 7, further comprising:
storing the variable at the memory sub-system, wherein the variable is accessible by firmware of the memory sub-system.

9. The method of claim 5, further comprising:
reordering the one or more available namespace blocks based at least in part on the unmapping of each namespace block.

10. The method of claim 1, further comprising:
associating an indication with the unmapped namespace block before mapping the unmapped namespace block to the namespace, wherein the indication is representative of a first-available namespace block for mapping;
disassociating the indication from the unmapped namespace block after mapping the unmapped namespace block to the namespace; and
associating the indication with a second unmapped namespace block different from the unmapped namespace block based at least in part on the mapping of the one or more available namespace blocks to the namespace, wherein the second unmapped namespace block comprises a first available namespace block of available namespace blocks of the namespace map.

11. The method of claim 10, further comprising:
reordering all available namespace blocks of the set of namespace blocks based at least in part on the mapping of the one or more available namespace blocks.

12. The method of claim 1, wherein each of the set of namespace blocks is associated with a respective index corresponding to a group of logical block addresses, and wherein the ordering of the namespace map is based at least in part on the respective indices.

13. The method of claim 1, wherein the namespace map comprises a variable for indicating that the unmapped namespace block and each namespace block following the unmapped namespace block, according to an ordering of the namespace map, are available for mapping.

14. The method of claim 1, wherein the mapping of the one or more available namespace blocks to the namespace is performed upon boot-up of the memory sub-system.

15. A method, comprising:
generating a namespace map having a set plurality of namespace blocks, wherein a namespace block of the set plurality of namespace blocks indicates that the namespace block and each namespace block following the namespace block, according to an ordering of the namespace map, are available for mapping, and wherein each namespace block comprises one or more logical block addresses, wherein the indication corresponds to a division of the namespace map where each namespace block ordered before the namespace block associated with the indication is unavailable for mapping and each namespace block ordered after the namespace block associated with the indication is available for mapping;

receiving a command to generate a namespace using the namespace map; and sequentially mapping, in response to the command, one or more available namespace blocks to the namespace according to the ordering of the namespace map, wherein the one or more available namespace blocks comprise at least the namespace block;

receiving a second command to erase the namespace; and unmapping, within the namespace map, each namespace block mapped to the namespace in response to the second command.

16. A system comprising:

a plurality of memory components; and a processing device, operatively coupled with the plurality of memory components, to:

generate a namespace map including a plurality of namespace blocks associated with the plurality of memory components, wherein an unmapped namespace block of the plurality of namespace blocks indicates that each namespace block after the unmapped namespace block within the namespace map are available for namespace mapping based on an ordering of the namespace map, wherein the indication corresponds to a division of the namespace map where each namespace block ordered before the unmapped namespace block associated with the indication is unavailable for mapping and each namespace block ordered after the unmapped namespace block associated with the indication is available for mapping;

receive, after generating the namespace map, a request to create a namespace using the namespace map; and map one or more available namespace blocks of the plurality of namespace blocks to a namespace in sequential order based on the ordering of the namespace map, wherein the one or more available namespace blocks comprise the unmapped namespace block, one or more namespace blocks after the unmapped namespace block, or a combination thereof.

17. The system of claim 16, wherein the processing device is further to:

map the one or more available namespace blocks in response to the request.

18. The system of claim 16, wherein the processing device is further to:

receive a request to delete the namespace after mapping the one or more available namespace blocks; and unmap the one or more available namespace blocks mapped to the namespace in response to the request.

19. A non-transitory computer-readable storage medium comprising instructions that, when executed by a processing device, cause the processing device to:

generate a namespace map having a set of namespace blocks associated with a memory sub-system, wherein an unmapped namespace block of the set of namespace blocks indicates that the unmapped namespace block and each namespace block following the unmapped namespace block, according to an ordering of the namespace map, are available for mapping, and wherein each namespace block comprises one or more logical block addresses associated with the memory sub-system, wherein the indication corresponds to a division of the namespace map where each namespace block ordered before the unmapped namespace block associated with the indication is unavailable for mapping and each namespace block ordered after the unmapped namespace block associated with the indication is available for mapping;

receive, after generating the namespace map, a request to create a namespace using the namespace map; and sequentially map, in response to the request, one or more available namespace blocks to the namespace according to the ordering of the namespace map, wherein the one or more available namespace blocks comprise at least the unmapped namespace block.

20. The non-transitory computer-readable storage medium of claim 19, wherein a size of the unmapped namespace block is based at least in part on a number of logical block addresses associated with the unmapped namespace block.

* * * * *